June 6, 1950 P. H. DAVEY 2,510,082
MECHANICAL MOVEMENT
Filed Dec. 28, 1948 3 Sheets-Sheet 1
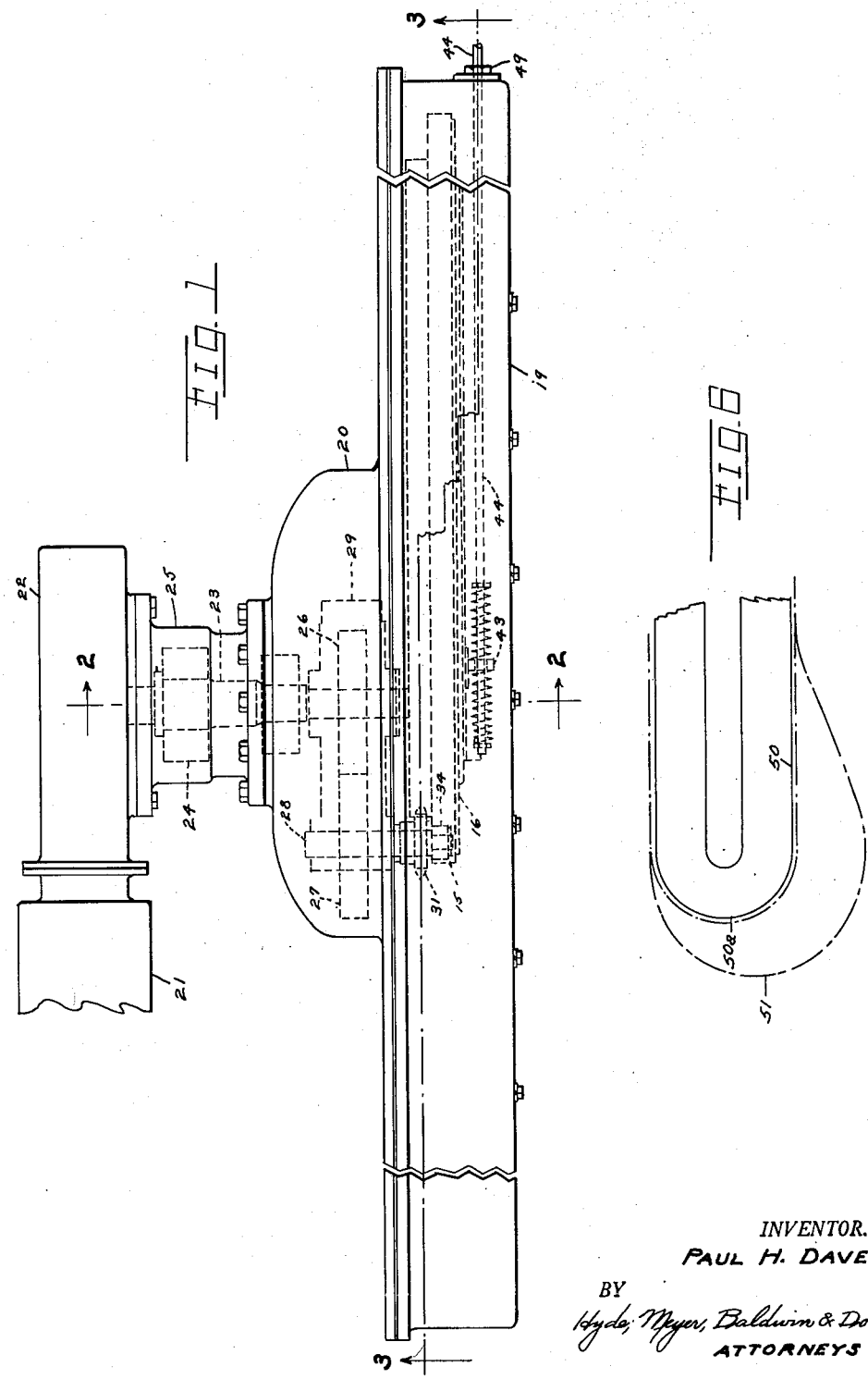
INVENTOR.
PAUL H. DAVEY
BY
Hyde, Meyer, Baldwin & Doran
ATTORNEYS

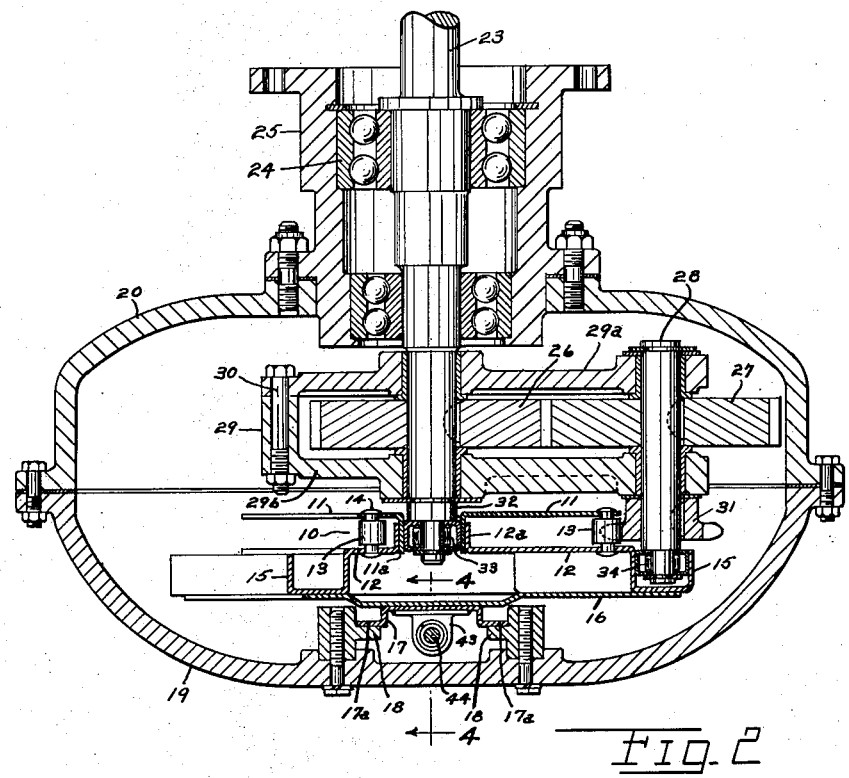
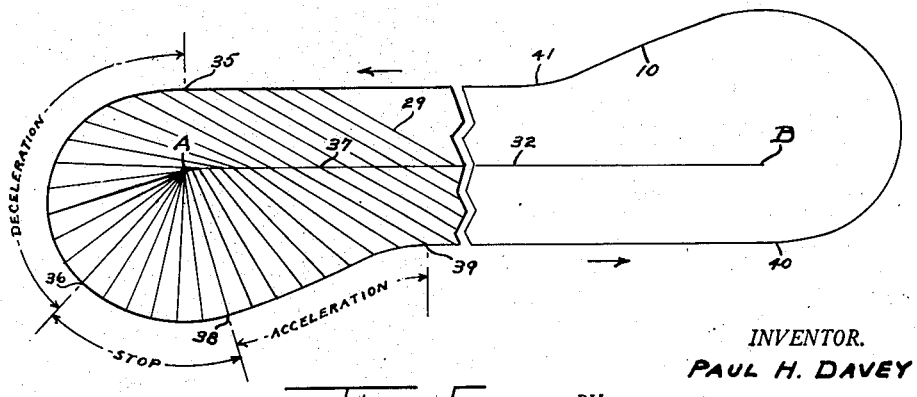

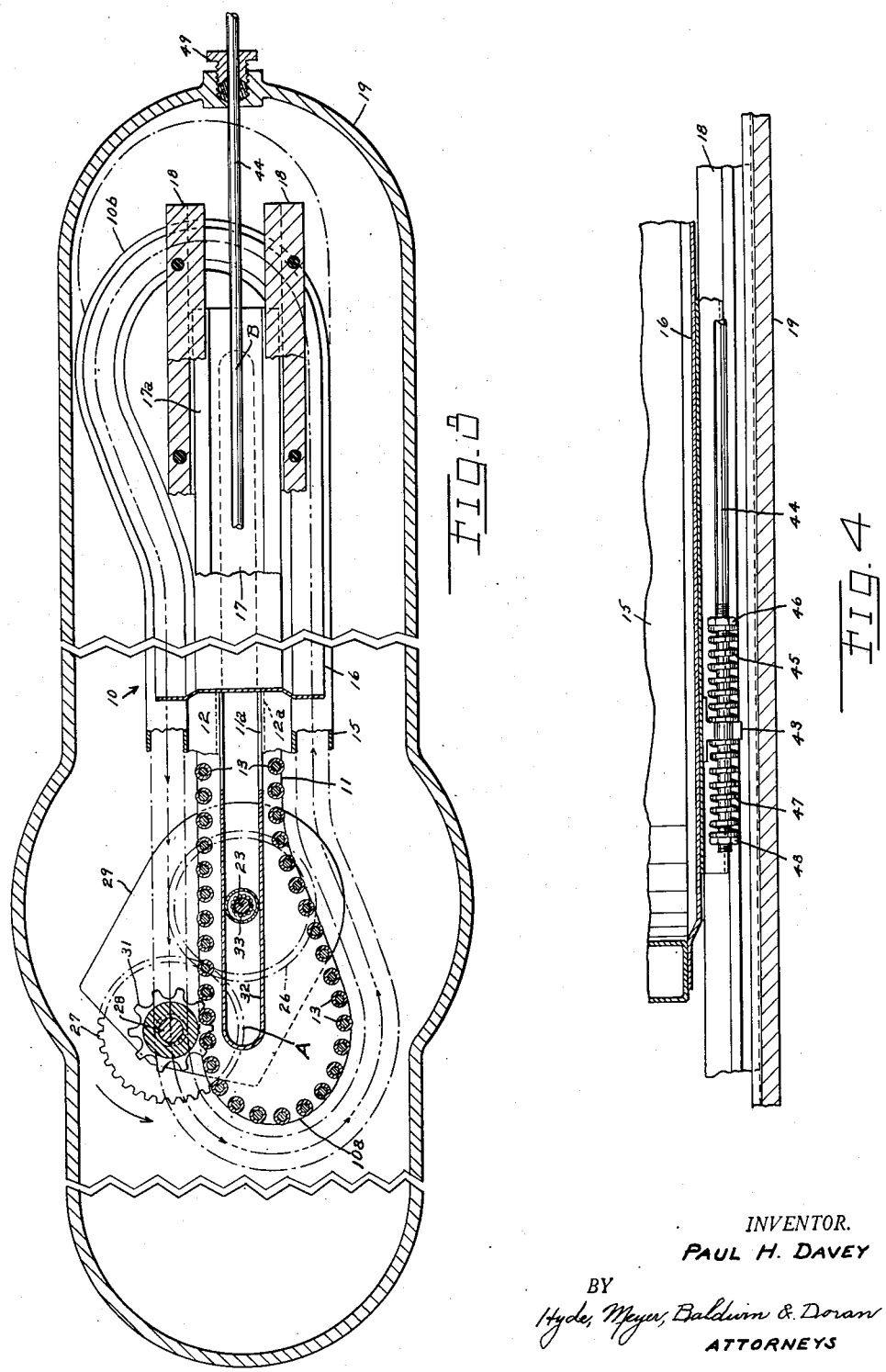

Patented June 6, 1950

2,510,082

UNITED STATES PATENT OFFICE 2,510,082

MECHANICAL MOVEMENT

Paul H. Davey, Kent, Ohio

Application December 28, 1948, Serial No. 67,654

5 Claims. (Cl. 74—31)

This invention relates to improvements in a mechanical movement for changing continuous rotary movement to intermittent translatory movement.

An object of the present invention is to provide a novel arrangement whereby a driving member rotating continuously in one direction may drive a reciprocating member backward and forward in an alternating translatory movement.

An object of the present invention also is to provide a device comprising a small number of parts compactly arranged.

Still another object of the invention is to provide a novel arrangement whereby the sudden starting and stopping of the reciprocating member at the ends of its path are eased so as to protect the parts against objectionable jar and wear.

Other objects and advantages of the present invention will be apparent from the accompanying drawings and description, and the essential features thereof will be set forth in the appended claims.

In the drawings,

Fig. 1 is a side elevational view showing one embodiment of my invention;

Fig. 2 is a sectional view taken along the line 2—2 of Fig. 1;

Fig. 3 is an enlarged sectional view taken along the line 3—3 of Fig. 1 with the oscillating arm in a slightly different position;

Fig. 4 is a fragmental sectional view taken along the line 4—4 of Fig. 2;

Fig. 5 is a diagrammatic view showing various positions of the parts during the operation of the device; while, Fig. 6 is a fragmental diagrammatic view illustrating one advantage of my invention over the prior art.

The translatory device which is to be given alternating movement backward and forward, comprises a device which may in general be called a rack 10 of narrow elongated form with bulbous ends. The details of this rack member will be more clearly understood from Fig. 2. The rack proper comprises an L-shaped plate 11 having a flange 11a secured as by welding to the flange 12a of a plate 12 which is parallel to the plate 11. Regular rack teeth might be supported between the plates 11 and 12, but I prefer to provide a series of rollers 13 mounted on pins 14 which are in turn properly secured between the plates 11 and 12. These pins provide a shaft on which the rollers 13 may turn in the manner of the rollers of a bicycle chain thereby eliminating a considerable amount of wear. Laterally outwardly from the plate portion 12 it is bent in channel form as indicated at 15 so as to provide a guideway for an oscillating arm as will presently be described. A bottom plate 16 is welded to the channelways 15 and serves to stiffen the entire rack structure. Welded to the bottom central portion of the plate 16 is a channel shoe member 17 opening downwardly and having flanges 17a turned outwardly and adapted to ride upon a pair of ways 18 which are bolted to the bottom cover 19. These ways will be oiled or greased so that the shoe 17 may reciprocate freely along the ways 18.

Power is applied to drive the rack member back and forth by means of any suitable device providing continuous rotation in one direction. In the present form this comprises a motor 21 which drives reduction gearing in the housing 22, the output shaft of which is shown at 23. This shaft is provided with suitable bearings 24 in a neck portion 25 which is bolted to the housing 22. A pinion 26 is keyed to the shaft 23 and this in turn meshes with a pinion 27 which is keyed to a jack shaft 28 which in turn is rotatably mounted in suitable bearings in an arm 29 having an upper half 29a and a lower half 29b secured together by bolt means 30. This arm is also provided with bearings on the shaft 23. Keyed to the lower end of the shaft 28, as viewed in Fig. 2, is a sprocket 31 having sprocket teeth which engage with the rack formed of a series of rollers 13 as clearly shown in Fig. 3. As shown in that view, with the sprocket 31 rotating in the direction of the arrow indicated, it will drive the rack member toward the right until the end of slot 32 in the rack engages the shaft 23 so as to stop the motion of the rack in that direction. The arm 29 then swings about the pivot axis A as the sprocket 31 travels around the bulbous rack end 10a. When the sprocket 31 engages the lower side of the rack member as viewed in Fig. 3 it will then drive the rack toward the left until motion is stopped at the other end of the slot 32. The arm 29 will then swing about the pivot axis B while the sprocket travels around the bulbous rack end 10b until the sprocket again reaches the upper portion of the rack when it will again drive the rack toward the right.

It will be noted that the shaft 23 is provided with a needle bearing 33 (Figs. 2 and 3) where it engages in the slot 32 in the rack member. Thus the shaft 23 serves as a central guide for the rack member as it reciprocates back and forth.

Means is necessary to guide the outer end of the arm 29 in order to cause it to travel in the desired manner along the rack portion and around the bulbous ends thereof. To this end the channel member 15 mentioned above, integral with the rack member, provides a continuous uninterrupted channel entirely along the straight rack portions and around the bulbous end portions parallel to and at a fixed distance outwardly from the series of rollers 13. At the lower end of shaft 23 as clearly seen in Fig. 2, I provide needle bearing 34 adapted to ride in a frictionless manner in the channel 15. It results from this construction that the arm 29 lies at an acute angle with respect to the longitudinal center line of the rack portion which is passing beneath it.

Referring to Fig. 5 I have tried to show this result diagrammatically by reversing the position of the parts. In other words, in the actual machine the shaft 23 stands still and the rack 10 moves. In this diagram I have reversed the parts so as to show the position of the arm 29 at various stages in the cycle of operation. While the sprocket 31 is traveling along the upper straight run of the rack the arm 29 slopes toward the left as shown. From point 35 to point 36 is a zone of deceleration. For equal increments of travel of sprocket 31, the shaft 23 travels progressively lesser amounts from 37 to A, the points near A being too close to show clearly on the drawing. At point 36 for sprocket 31, the shaft 23 has reached A and is stopped there while sprocket 31 travels from 36 to 38. From 38 to 39 is a zone of acceleration. For equal increments of travel of sprocket 31, the shaft 23 travels progressively greater amounts from A to 37, it being understood that these points need not be the same as when shaft 23 was slowing down. From 39 to 40 the speed of opposite ends of arm 29 is constant and the arm slopes downwardly and toward the right as viewed in Fig. 5. From 40 to 41, the arm 29 swings around point B exactly as it swung around point A. From 41 to 35 the arm 29 remains at a constant angle to the line AB, sloping upwardly and toward the left as viewed in Fig. 5.

Reverting back to the actual movements of the parts, the rack 10 slows down gradually while the sprocket 31 travels from 35 to 36, then stops from 36 to 38, then speeds up from 38 to 39.

Means may be provided to drive any desired piece of apparatus by means of the reciprocating rack member. To this end a bracket 43 is attached rigidly to the shoe member 17. This bracket member has an opening through which passes a rod 44. A helical spring 45 surrounds the rod on one side of the bracket 43 and is held between the bracket and a nut 46. A helical spring 47 on the opposite side of the bracket is held between the bracket and a nut 48 on the rod 44. Where the rod passes out of the housing 19 packing is provided by means of the packing gland 49 to prevent the escape of oil. The springs 45 and 47 absorb some of the shock due to the stopping of the rack at each end of its travel and the application of power to start the rack in its new direction.

The housing portions 19, 20, 25 and 22 are secured together in a liquid-tight manner so that the entire device may run in oil if desired.

Referring to Fig. 6, I have illustrated diagrammatically one manner in which my device is an improvement over prior known devices such as that shown in United States Patent 16,155, granted December 2, 1856 to Albin Warth and United States Patent 1,598,553 granted August 31, 1926 to Robert S. Butler. In these prior devices a rack as illustrated at 50 in Fig. 6 is provided having parallel side portions and semicircular end portions, such as that indicated at 50a, which are joined tangentially to the straight run portions. My device provides the bulbous end indicated at 51. It should be obvious from an inspection of Fig. 6 that a pinion, such as 31 shown in my drawings, traveling about the path 51 travels at a slower rate or rather takes longer to pass around the end of the rack than if the same were traveling at the same speed or rotation around the rack portion 50a. It is this feature of giving a greater period of time for the arm 29 and the sprocket member 31 to swing around the end of the rack which I regard as a great advantage.

But of much greater importance is the fact that the shape of the bulbous ends of my rack construction provide a means for producing progressive deceleration to a full stop, and progressive acceleration from a full stop to full operating speed of the rack at the end of each stroke of the rack. This is exactly comparable to the progressive deceleration and acceleration which occurs at each end of the stroke of an engine piston which is actuated by the rotating crank throw of a conventional crankshaft by which it is possible to accomplish the rapid reciprocation of engine pistons without damage to the reciprocating parts.

In the evolution of my present design, and before I had arrived at the solution represented by the bulbous ends of the rack, I passed through a stage comparable to the construction of Warth and Butler, mentioned above, in which I merely made use of semi-circular end portions of the rack joined tangentially to the straight run portions. I found as a result that the rack rushed at full speed until it was stopped abruptly by the end of shaft 23 at bearing 33 at rack positions A and B. Then arm 29 was thrown instantaneously into full motion around arc 50a. And when motion about arc 50a had been completed at full speed, the momentum of arm 29 was such as to set up a very destructive hammering action at the point where arc 50a joins the straight run portion 50. It is my opinion that it was the highly destructive action here described which has prevented the successful development of such drives as those of Warth and Butler, and which will be satisfactorily met by the design of my rack.

I have described my invention with the parts moving according to the arrows of Fig. 5. I believe that this unit could also be operated in reverse direction, in which case the driving pinion would approach the end of the rack at position 39, would then go through a period of deceleration in the zone 39 to 38, would stop in the arc 38—36, and would then accelerate through the arc 36—35.

What I claim is:

1. In combination, a continuous rack having two generally parallel runs connected at their ends by curved end portions, the length of each end portion being greater than a semicircle having a radius equal to half the perpendicular distance between said parallel runs, a rotatable pinion meshing with said rack, means mounting said rack for reciprocation endwise, an arm carrying said pinion, a shaft lying in a plane at right angles to said rack, said shaft positioned on the longitudinal center line between said parallel rack runs, said arm freely rotatable about said shaft, the effective length of said arm being greater than half the perpendicular distance between said parallel runs, means concentric with said shaft for rotating said pinion, and guide means for holding said arm at an acute angle to said longitudinal center line and inclined relative to the approaching end of said rack when said pinion is traversing each of said parallel runs.

2. In combination, a continuous rack having two generally parallel runs connected at their ends by curved end portions, the length of each end portion being greater than a semicircle having a radius equal to half the perpendicular distance between said parallel runs, a rotatable pinion meshing with said rack, means mounting said rack for reciprocation endwise, and means mounting said pinion member for engagement with said parallel rack runs and for movement from one of said runs to the other around and in engagement with said curved rack end portions under the driving action of said rotatable pinion.

3. The combination of claim 1 wherein said rack has a frame providing parallel longitudinally extending edges centrally of the rack, and said shaft engages between said edges to guide said rack as it reciprocates.

4. The combination of claim 1 wherein said rack comprises parallel frame portions and a series of evenly spaced rollers rotatably mounted between said frame portions and adapted to mesh with said pinion.

5. The combination of claim 1 including a first gear mounted on said shaft and rotatable therewith, a jack shaft rotatably mounted in said arm near its free end, said pinion rotatable with said jack shaft, a second gear on said jack shaft and rotatable therewith, said first and second gears meshing, and means for rotating said first named shaft.

PAUL H. DAVEY.

REFERENCES CITED

The following references are of record in the file of this patent:

UNITED STATES PATENTS

| Number | Name | Date |
|---|---|---|
| 1,137,114 | Bowser | Apr. 27, 1915 |
| 1,598,553 | Butler | Aug. 31, 1926 |